United States Patent
Effler et al.

(10) Patent No.: US 8,835,569 B2
(45) Date of Patent: *Sep. 16, 2014

(54) FRACTIONAL MELT INDEX POLYETHYLENE COMPOSITION AND FILMS MADE THEREFROM

(75) Inventors: Lawrence J. Effler, Rosharon, TX (US); Cornelis F. J. den Doelder, Terneuzen (NL); Mehmet Demirors, Pearland, TX (US); Jian Wang, Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/808,724

(22) PCT Filed: Jun. 8, 2012

(86) PCT No.: PCT/US2012/041450
§ 371 (c)(1),
(2), (4) Date: Mar. 5, 2013

(87) PCT Pub. No.: WO2013/002997
PCT Pub. Date: Jan. 3, 2013

(65) Prior Publication Data
US 2014/0100336 A1    Apr. 10, 2014

Related U.S. Application Data

(60) Provisional application No. 61/503,051, filed on Jun. 30, 2011.

(51) Int. Cl.
*C08L 33/04* (2006.01)
*C08L 33/10* (2006.01)
*C08F 8/00* (2006.01)
*C08L 23/06* (2006.01)

(52) U.S. Cl.
CPC .................................. *C08L 23/06* (2013.01)
USPC .......................................... 525/191; 525/240

(58) Field of Classification Search
CPC ..... C08L 23/06; C08L 23/08; C08L 2203/16; C08L 2303/162; C08L 2205/025; C08L 2314/02
USPC .................................................. 525/191, 240
See application file for complete search history.

(56) References Cited

U.S. PATENT DOCUMENTS

2007/0117946 A1   5/2007   Schwab
2011/0136982 A1   6/2011   Tse
2012/0130019 A1*  5/2012   Karjala et al. ................. 525/240

OTHER PUBLICATIONS

PCT Search Report dated Jul. 20, 2012; from PCT counterpart Application No. PCT/US12/41450.

* cited by examiner

*Primary Examiner* — Nathan M Nutter

(57) ABSTRACT

A reactor blend polyethylene composition comprising: from 35 to 70 percent by weight of a first polyethylene component; and a second polyethylene component; wherein the polyethylene resin has a melt index $I_2$ of less than 1 dg/min and greater than or equal to 0.25 dg/min and exhibits a V0.1/V100 of greater than or equal to 9; and wherein the first and second polyethylene components are produced in continuous dual solution polymerization reactors, wherein the second polyethylene component is produced in the presence of the first polyethylene component and wherein a Ziegler-Natta catalyst is present in each of the first and second polymerization reactors is provided. Also provided are methods for producing the polyethylene resin and films made therefrom.

15 Claims, No Drawings

FRACTIONAL MELT INDEX POLYETHYLENE COMPOSITION AND FILMS MADE THEREFROM

FIELD OF INVENTION

The instant invention relates to fractional melt index reactor blend polyethylene composition and films made therefrom.

BACKGROUND OF THE INVENTION

Enhanced melt strength ethylene-based copolymers are useful in a variety of applications, such as those requiring film strength during thermoforming or to increase production rates in processing. Fractional melt index linear low density polyethylene (LLDPE) resins (which have a melt index, $I_2$, of less than 1 dg/min) typically have higher melt strength than polyethylene resins of $I_2 \geq 1$ dg/min. Higher melt strength can translate into greater bubble stability during blown film processing allowing for higher line rates. However, the higher molecular weight of the fractional melt index resins can limit the output rate during extrusion due to higher head pressures. In addition, fractional melt index resins are more prone to melt fracture resulting in a film with poor surface quality and reduced rates as a means to minimize/eliminate melt fracture.

The present invention provides a fractional melt index, broad molecular weight distribution polyethylene resin having both high melt strength and bubble stability but the extrusion characteristics of resins having an $I_2$ equal to greater than 1 dg/min.

SUMMARY OF THE INVENTION

The instant invention is a reactor blend polyethylene composition, method of producing the same, and a film made therefrom.

In one embodiment, the instant invention reactor blend polyethylene composition comprising: from 35 to 70 percent by weight of a first polyethylene component; and a second polyethylene component; wherein the polyethylene composition has a melt index $I_2$ of less than 1 dg/min and greater than or equal to 0.25 dg/min and exhibits a V0.1/V100 of greater than or equal to 9; and wherein the first and second polyethylene components are produced in continuous dual solution polymerization reactors, wherein the second polyethylene component is produced in the presence of the first polyethylene component and wherein a Ziegler-Natta catalyst is present in each of the first and second polymerization reactors.

In an alternative embodiment, the instant invention further provides a process for producing a reactor blend polyethylene composition comprising: polymerizing from 35 to 70 percent by weight of a first polyethylene component in the presence of a first Ziegler-Natta catalyst in a first polymerization reactor to make a first reactor product having a melt index ($I_2$) of less than 0.1; continuously passing the first reactor product to a second polymerization reactor, wherein the second polymerization reactor contains a second Ziegler-Natta catalyst to make the reactor blend polyethylene composition; wherein the polyethylene composition has a melt index ($I_2$) less than 1 dg/min and greater than or equal to 0.25 dg/min, In an alternative embodiment, the instant invention provides a polyethylene composition, method of producing the same, and films made therefrom, except that the polyethylene composition has a density from 0.90 to 0.94 g/cc.

In an alternative embodiment, the instant invention provides a polyethylene composition, method of producing the same, and films made therefrom, except that the polyethylene composition has a density from 0.915 to 0.930 g/cc.

In an alternative embodiment, the instant invention provides a polyethylene composition, method of producing the same, and films made therefrom, except that the polyethylene composition has a melt strength of at least 4.5 cN.

In an alternative embodiment, the instant invention provides a polyethylene composition, method of producing the same, and films made therefrom, except that the polyethylene composition has a melt strength of at least 6.0 cN.

In an alternative embodiment, the instant invention provides a polyethylene composition, method of producing the same, and films made therefrom, except that the polyethylene composition has a Mw/Mn of equal to or greater than 5.

In an alternative embodiment, the instant invention provides a polyethylene composition, method of producing the same, and films made therefrom, except that the Ziegler-Natta catalyst in the first polymerization reactor is the same or different as the Ziegler-Natta catalyst in the second polymerization reactor.

In an alternative embodiment, the instant invention provides a polyethylene composition, method of producing the same, and films made therefrom, except that the polyethylene composition has a melt index ($I_2$) from 0.3 to 0.75 dg/min.

In an alternative embodiment, the instant invention provides a polyethylene composition, method of producing the same, and films made therefrom, except that the polyethylene composition has a melt index ($I_2$) from 0.4 to 0.6 dg/min.

In an alternative embodiment, the instant invention provides a polyethylene composition, method of producing the same, and films made therefrom, except that the polyethylene composition may be used in a blown film process at motor load, screen pressures and melt temperatures within 10% of those of a polyethylene resin having a melt index ($I_2$) of equal to or greater than 1 and achieving at least a 10% increase in output rate in comparison to the polyethylene resin having a melt index ($I_2$) of equal to or greater than 1.

In an alternative embodiment, the instant invention provides a polyethylene composition, method of producing the same, and films made therefrom, except that the film has a dart value within 10% of that of a polyethylene composition having a melt index ($I_2$) of equal to or greater than 1.

In an alternative embodiment, the instant invention provides a polyethylene composition, method of producing the same, and films made therefrom, except that the film has a tensile strength within 10% of that of a polyethylene composition having a melt index ($I_2$) of equal to or greater than 1.

In an alternative embodiment, the instant invention provides a polyethylene composition, method of producing the same, and films made therefrom, except that the film has a puncture resistance within 10% of that of a polyethylene composition having a melt index ($I_2$) of equal to or greater than 1.

DETAILED DESCRIPTION OF THE INVENTION

The instant invention provides reactor bend polyethylene composition, a method of making such composition and films made therefrom.

The polyethylene resin according to the present invention comprises: from 35 to 70 percent by weight of a first polyethylene component; and a second polyethylene component; wherein the polyethylene resin has a melt index, $I_2$, of less than 1 dg/min and greater than or equal to 0.25 dg/min and exhibits a V0.1/V100 of greater than or equal to 9; and wherein the first and second polyethylene components are produced in continuous dual solution polymerization reactors, wherein the second polyethylene component is produced in the presence of the first polyethylene component and wherein a Ziegler-Natta catalyst is present in each of the first and second polymerization reactors.

All individual values and subranges from 35 to 70 weight percent of a first polyethylene component are included herein and disclosed herein; for example, the amount of the first polyethylene component can be from a lower limit of 35, 40, 45, 50, 55, 60, or 65 weight percent to an upper limit of 40, 45, 50, 55, 60, 65, or 70 weight percent. For example, the amount of the first polyethylene component may be in the range of from 35 to 70 weight percent, or in the alternative, the amount of the first polyethylene component may be in the range of from 45 to 70 weight percent, or in the alternative, the amount of the first polyethylene component may be in the range of from 40 to 60 weight percent, or in the alternative, the amount of the first polyethylene component may be in the range of from 50 to 70 weight percent.

All individual values and subranges from greater than or equal to 0.25 to less than 1 dg/min melt index ($I_2$) are included herein and disclosed herein; for example, the melt index ($I_2$) of the polyethylene resin can be from a lower limit of 0.25, 0.35, 0.45, 0.55, 0.65, 0.75, 0.85 or 0.95 dg/min to an upper limit of 0.35, 0.45, 0.55, 0.65, 0.75, 0.85, 0.95, or 0.98 dg/min. For example, the melt index ($I_2$) of the polyethylene resin may be in the range of from 0.25 to 0.98 dg/min, or in the alternative, the melt index ($I_2$) of the polyethylene resin may be in the range of from 0.3 to 0.75 dg/min, or in the alternative, the melt index ($I_2$) of the polyethylene resin may be in the range of from 0.4 to 0.6 dg/min.

All individual values and subranges of V0.1/V100 of greater than or equal to 9 are included herein and disclosed herein; for example, the V0.1/V100 of the polyethylene resin can be from a lower limit of 9, 9.2, 9.4, 9.6, 9.8, 10, 10.5 or 10.7.

In some embodiments, the polyethylene composition has a density from 0.90 to 0.94 g/cc. All individual values and subranges from 0.90 to 0.94 g/cc are included herein and disclosed herein; for example, the polyethylene composition density can be from a lower limit of 0.90, 0.91, 0.92, 0.93 or 0.935 g/cc to an upper limit of 0.91, 0.925, 0.93 or 0.94 g/cc. For example, the polyethylene composition density may be in the range of from 0.90 to 0.94 g/cc, or in the alternative, the polyethylene composition density may be in the range of from 0.915 to 0.93 g/cc, or in the alternative, the polyethylene composition density may be in the range of from 0.92 to 0.94 g/cc, or in the alternative, the polyethylene composition density may be in the range of from 0.90 to 0.93 g/cc.

In another embodiment, the invention provides any of the foregoing embodiments of the polyethylene resin wherein the polyethylene resin has a melt strength of at least 4.5 cN. All individual values and subranges of melt strength of equal to or greater than 4.5 cN are included herein and disclosed herein; for example, the melt strength of the polyethylene resin can be from a lower limit of 4.5, 4.8, 5.1, 5.4, 5.7, 6, 6.4, or 6.6 cN.

In another embodiment, the invention provides any of the foregoing embodiments of the polyethylene resin wherein the polyethylene resin has a Mw/Mn of equal to or greater than 5. All individual values and subranges of Mw/Mn of equal to or greater than 5 are included herein and disclosed herein; for example, the Mw/Mn of the polyethylene resin can be from a lower limit of 5, 5.2, 5.4, 5.6, 5.8, 6.0 or 6.2.

In another embodiment, the invention provides any of the foregoing embodiments of the polyethylene resin wherein the Ziegler-Natta catalyst in the first polymerization reactor is the same or different as the Ziegler-Natta catalyst in the second polymerization reactor. Exemplary Ziegler Nana catalysts useful in producing the inventive polyethylene resin are discussed in more detail below.

In an alternative embodiment, the inventive polyethylene resin may comprise from 0.05 to 10 mole percent of units derived from one or more α-olefin comonomers. All individual values and subranges from 0.05 to 10 mole percent are included herein and disclosed herein; for example, the inventive polyethylene resin can be from a lower limit of 0.05, 0.5, 1, 2, 5, 8 mole percent of units derived from one or more α-olefin comonomers to an upper limit of 0.5, 1, 2, 4, 8, 10 mole percent of units derived from one or more α-olefin comonomers. For example, the amount of units derived from one or more α-olefin comonomers in the inventive polyethylene resin may be in the range of from 0.05 to 10 mole percent, or in the alternative, the amount of units derived from one or more α-olefin comonomers in the inventive polyethylene resin may be in the range of from 1 to 5 mole percent, or in the alternative, the amount of units derived from one or more α-olefin comonomers in the inventive polyethylene resin may be in the range of from 2 to 3 mole percent.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may be selected, for example, from the group consisting of propylene, 1-butene, 1-hexene, and 1-octene; or in the alternative, from the group consisting of 1-hexene and 1-octene.

In another alternative embodiment, the instant invention further provides a process for producing a polyethylene resin comprising: polymerizing from 35 to 70 percent by weight of a ethylene in the presence of a first Ziegler-Natta catalyst in a first polymerization reactor to make a first reactor product; passing the first reactor product to a second polymerization reactor, wherein the second polymerization reactor contains a second Ziegler-Natta catalyst to make a second reactor; wherein the blend exhibits a V0.1/V100 of greater than or equal to 9.

Any conventional polymerization processes may be employed to produce the inventive ethylene/alpha-olefin interpolymers. Such conventional polymerization processes include, but are not limited to, solution polymerization process, slurry phase polymerization process, and combinations thereof using one or more conventional reactors, e.g. loop reactors, isothermal reactors, fluidized bed reactors, stirred tank reactors, batch reactors in parallel, series, and/or any combinations thereof.

The inventive ethylene/alpha-olefin interpolymer may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 140 to 300° C.; for example, from 150 to 190° C., and at pressures in the range of from 300 to 1000 psi; for example, from 400 to 750 psi. The residence time in solution phase polymerization process is typically in the range of from 2 to 30 minutes; for example, from 10 to 20 minutes. Ethylene, solvent, multi-constituent catalyst composition, and optionally one or more comonomers are fed continuously to the reactor. Exemplary multi-constituent catalyst compositions in these embodiments include, for example, Ziegler-Natta catalysts, as described herein. Exemplary solvents include, but are not limited to, isoparaffins. For example, such solvents are commercially available under the name ISOPAR, E from ExxonMobil Chemical Co., Houston, Tex. The resultant mixture of the inventive ethylene/alpha-olefin interpolymer and solvent is then removed from the reactor and the inventive ethylene/alpha-olefin interpolymer is isolated. Solvent is typically recovered via a solvent recovery unit, i.e. heat exchangers and vapor liquid separator drum, and is then recycled back into the polymerization system.

In one embodiment, the inventive ethylene/alpha-olefin interpolymer may be prepared using a multi-constituent catalyst composition, as described herein, suitable for (co)polymerizing ethylene and one or more α-olefin comonomers, e.g. 1-octene, via a solution phase polymerization process in a loop reactor in accordance with the following procedure. All raw materials (ethylene, 1-octene) and the process solvent (an isoparaffinic solvent, for example ISOPAR E) are purified with molecular sieves before introduction into the reaction environment. Hydrogen is supplied as a high purity grade and is not further purified. The reactor monomer feed (ethylene) stream is pressurized via a mechanical compressor to a pressure that is above the reaction pressure, e.g. 750 psig. The solvent and comonomer (1-octene) feed is pressurized via a mechanical positive displacement pump to a pressure that is above the reaction pressure, e.g. 750 psig. The individual catalyst components are manually batch diluted to specified component concentrations with purified solvent (ISOPAR E) and pressured to a pressure that is above the reaction pressure, e.g. 750 psig. All reaction feed flows are measured with mass flow meters and independently controlled with computer automated valve control systems.

The continuous solution polymerization reactor may consist of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at, for example, two locations roughly with equal reactor volumes between each injection location. The fresh feed is controlled typically with each injector, for example, receiving half of the total fresh feed mass flow. The catalyst components are injected into the polymerization reactor through, for example, a specially designed injection inlet device and are combined into one mixed. procatalyst/cocatalyst feed stream prior to injection into the reactor. The procatalyst component feed is computer controlled to maintain the reactor monomer concentration at a specified target, The cocatalyst component is fed based on calculated specified molar ratios to the procatalyst component. Immediately following each fresh injection location (either feed or catalyst), the feed streams are mixed with the circulating polymerization reactor contents with static mixing elements such as Kenics static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop can be provided by a screw pump. The effluent from the polymerization reactor (containing solvent, monomer, comonomer, hydrogen, catalyst components, and molten polymer) exits the reactor loop and enters a zone where it is contacted with a deactivating and acid scavenging agent (typically calcium stearate and the accompanying water of hydration) to stop the reaction and scavenge hydrogen chloride. In addition, various additives such as anti-oxidants can be added at this point. The stream then goes through another set of static mixing elements such as Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve, which is responsible for maintaining the pressure of the reactor at a specified target. The stream then enters a two stage separation and devolatilization system where the polymer is removed from the solvent, hydrogen, and unreacted monomer and comonomer. The separated and devolatilized polymer melt is, for example, pumped through a die specially designed for underwater pelletization, cut into uniform solid pellets, dried, and transferred into a hopper. After validation of initial polymer properties, the solid polymer pellets are transferred to storage devices.

The portions removed in the devolatilization step may be recycled or destroyed. For example, most of the solvent is recycled back to the reactor after passing through purification beds. This recycled solvent can still have unreacted co-monomer in it that is fortified with fresh co-monomer prior to re-entry to the reactor. This recycle solvent can still have some hydrogen which is then fortified with fresh hydrogen.

In one embodiment, the inventive ethylene/alpha-olefin interpolymer may be prepared using a multi-constituent catalyst system suitable for (co)polymerizing ethylene and one or more α-olefin comonomers, e.g. 1-octene, via a solution phase polymerization process in two adiabatic spherical reactors, linked together in series in accordance to the following procedure. The ethylene monomer, 1-octene comonomer, and hydrogen are combined with a solvent, e.g. an isoparaffinic solvent such as ISOPAR E. Impurities such as water, carbon dioxide, sulfurous compounds are removed from the feed streams, and the feed streams are cooled to temperature in the range of 5° C. to 60° C., for example, approximately 13° C., before entering the reactor. The majority, approximately from 85 to 90 percent, of the reaction may occur in the first spherical reactor. The mixing may be achieved via circulating the polymer/procatalysticocatalyst/solvent/ethylene/co-monomer/hydrogen solution with one or more agitators equipped with mixing blades. The feed (ethylene/comonomer/solvent/hydrogen) may, for example, enter the reactor from the bottom and the procatalyst/cocatalyst may, for example, enter the reactor separately from the feed and also from the bottom. The first reactor temperature is in the range of from 170° C. to 190° C., for example, approximately 175° C., and the reactor pressure is in the range of from 400 psi to 1000 psi, for example, approximately 500 psi. The temperature of the second reactor, in series with the first, increases to a temperature in the range of from 175° C. to 210° C., for example, approximately 202° C. with approximately from 10 to 15 percent of the remaining reaction occurring and no additional catalyst or monomers are added. Procatalyst/co-catalyst Al/Ti molar feed ratio is set at value in the range of 0.5:1 to 6:1. The average reactor residence time is in the range of from 2 to 30 minutes, for example, approximately 8 minutes per spherical reactor prior to termination post-reactor by a fluid specially designed for that purpose. After the polymer solution leaves the reactor, the solvent with unconverted ethylene monomer and 1-octene comonomer may be removed from the polymer solution via a two stage devolatilizer system, and then recycled. Impurities may be removed from the recycled stream before entering the reactor again. The polymer melt may, for example, be pumped through a die specially designed for underwater pelletization. The pellets are transferred to classifier screens to remove over and undersize particles. The finished pellets are then transferred to storage devices.

In some embodiments of the inventive process, a primary antioxidant is added after to the polymerization reactor product after such product is removed from the reactor and before the product is heated by post reactor heaters ("post-reactor"). Examples of suitable primary antioxidants for use in embodiments of the inventive process include hindered phenolics (e.g., IRGANOX 1010, available from BASF).

Some embodiments of the inventive process further include adding a secondary antioxidant to the post-reactor. Examples of suitable secondary antioxidants for use in embodiments of the inventive process include phosphites (e.g., IRGAFOS 168, available from BASF).

The multi-constituent catalyst system includes a Ziegler-Natta catalyst composition including a magnesium and titanium containing procatalyst and a cocatalyst. The procatalyst is a Ziegler Natta catalyst including a titanium compound supported on $MgCl_2$. The cocatalyst is a triethylaluminum (TEA). The procatalyst may have a Ti:Mg ratio between 1.0:40 to 5.0:40, for example, 3.0:40. The procatalyst and the cocatalyst components can be contacted either before entering the reactor or in the reactor. The procatalyst may, for example, be any other titanium based Ziegler Natta catalyst. The Al:Ti molar ratio of cocatalyst component to procatalyst component can be from 0.5:1 to 10:1, for example 3:1.

The multi-constituent catalyst system includes a Ziegler-Natta catalyst composition including a magnesium and titanium containing procatalyst and a cocatalyst. The procatalyst may, for example, comprise the reaction product of magnesium dichloride, an alkylaluminum dihalide, and a titanium alkoxide. The procatalyst may comprise the reaction product of:

(A) a magnesium halide prepared by contacting:
  (1) at least one hydrocarbon soluble magnesium component represented by the general formula R" R'Mg.xAlR'3 wherein each R" and R' are alkyl groups;
  (2) at least one non-metallic or metallic halide source under conditions such that the reaction temperature does not exceed a temperature in the range of from 20 to 40° C., for example, it does not exceed about 40° C.; or in the alternative, it does not exceed about 35° C.;

(B) at least one transition metal compound represented by the formula $Tm(OR)y Xy-x$ wherein Tm is a metal of Groups IVB, VB, VIB, VIIB or VIII of the Periodic Table; R is a hydrocarbyl group having from 1 to about 20, for example from 1 to about 10 carbon atoms; X is a halide, and $y$ and $x$ are integers and their sum is equal to 4, and (C) an additional halide source to provide the desired excess X:Mg ratio; wherein additional halide source may be an organo halide compound of Group IIIA metal including, for example, those represented by the formula $R'_yMX_z$; wherein M is a metal from Group IIIA of the Periodic Table of Elements, for example aluminum or boron; each R' is independently an alkyl group having from 1 to 20, for example from 1 to 10, or in the alternative, from 2 to 8, carbon atoms; X is a halogen atom, for example chlorine; $y$ and $z$ each independently have a value from 1 to a value equal to the valence of M. Particularly suitable organo halide compounds include, for example, ethylatuminum dichloride, ethylaluminum sequichloride; diethylaluminum chloride; isobutylaluminum dichloride; diisobutyialuminum chloride; octylatuminum dichloride; and combinations of two or more thereof.

Particularly suitable transition metal compounds include, for example, titanium tetrachloride, titanium trichloride, tetra (isopropoxy)-titanium, tetrabutoxytitanium, diethoxytitanium dibromide, dibutoxytitanium dichloride, tetraphenoxytitanium, tri-isopropoxy vanadium oxide, zirconium tetra-n-propoxide, mixtures thereof and the like.

Other suitable titanium compounds which can be employed as the transition metal component herein include at least one titanium compound represented by the formula $Ti(OR)x X4-x$ wherein each .ft is independently a hydrocarbyl group having from 1 to about 20, for example from about 1 to about 10, or in the alternative, from about 2 to about 4 carbon atoms; X is a halogen and x has a value from zero to 4.

The foregoing procatalyst components are combined in proportions sufficient to provide atomic ratios as previously mentioned.

The foregoing pro-catalytic reaction product is prepared in the presence of an inert diluent. The concentrations of catalyst components are such that when the essential components of the catalytic reaction product are combined, the resultant slurry is from about 0.005 to about 1.0 molar (moles/liter) with respect to magnesium. Exemplary suitable inert organic diluents include, but are not limited to, liquefied ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, and naphthas. Exemplary suitable inert organic diluents are five of any olefin compounds and other impurities. Exemplary suitable inert organic diluents have boiling points in the range of from –50 ° C. to 200 ° C. Mixing of the procatalyst components to provide the desired catalytic reaction product is advantageously prepared under an inert atmosphere such as nitrogen, argon or other inert gas at temperatures in the range of from 10° C. to 50° C.; for example, from 20° C. to 40° C., provided that the magnesium halide support is prepared such that the reaction temperature does not exceed 35° C. In the preparation of the catalytic reaction product, it is not necessary to separate hydrocarbon soluble components from hydrocarbon insoluble components of the reaction product.

The procatalyst composition serves as one component of a Ziegler-Natta catalyst composition, in combination with a cocatalyst. The cocatalyst is employed in a molar ratio based on titanium in the procatalyst of from 1:1 to 100:1; for example, in a molar ratio in the range of from 0.5:1 to 3:1.

In one embodiment, a comonomer is introduced into the first reactor. In an alternative embodiment, a comonomer is introduced into both the first and second reactors.

In one embodiment of the inventive process, a catalyst is injected solely into the first reactor. In an alternative embodiment, catalyst is injected into both the first and second reactors.

The inventive polyethylene resin may be blended with one or more additives. Such additives include, but are not limited to, antistatic agents, color enhancers, dyes, lubricants, fillers, pigments, primary antioxidants, secondary antioxidants, processing aids, UV stabilizers, and combinations thereof. The blend of the inventive polyethylene resin with one or more additives may contain any amounts of additives. The blend of the inventive polyethylene resin and one or more additives may compromise from about 0 to about 10 percent h the combined weight of such additives, based on the weight of the inventive polyethylene resin and the one or more additives.

In an alternative embodiment, the instant invention further provides films made from the inventive polyethylene resin or blend thereof with one or more other polymers, for example LDPE. Such films may include, but are not limited to, clarity shrink films, collation shrink films, cast stretch films, silage films, stretch hooder films, sealants, stand up pouch films, liner films, machine direction oriented films, and diaper backsheets. Different methods may be employed to manufacture such films. Suitable conversion techniques include, but are not limited to, blown film process, cast film process, tenter frame process, double bubble process, such as partially crosslinked or non-crosslinked, vertical or horizontal form fill and seal process. Such techniques are generally well known. In one embodiment, the conversion technique includes, but is not limited to, the blown film process.

The films according to the present invention may include at least one film layer, such as a monolayer film, or at least one layer in a multilayer film prepared by cast, blown, calendered, or extrusion coating processes. The inventive ethylene/α-olefin copolymer or blend thereof with one or more other polymers, for example LDPE, may be used in a variety of films, including but not limited to clarity shrink films, collation shrink films, cast stretch films, silage films, stretch hooder films, sealants, stand up pouch films, liner films, machine direction oriented films, and diaper backsheets.

The polyethylene resin according to any one of the preceding embodiments provides good processability into films while also providing films with good physical characteristics. In one embodiment, the inventive resins may be used in a blown film process at screw speeds, screen pressures and melt temperatures within 10% of those of a polyethylene resin having a melt index ($I_2$) of equal to or greater than 1 and achieving at least a 15% increase in output rate in comparison to the polyethylene resin having a melt index ($I_2$) of equal to or greater than 1.

EXAMPLES

The following examples illustrate the present invention but are not intended to limit the scope of the invention.

Preparation of Inventive Example 1 and Comparative Examples 1 and 2

Inventive Example 1 and Comparative Examples 1 and 2 were each made in a catalyzed polyethylene solution polymerization process in which solvent, ethylene, and 1-octene co-monomer were fed as a combined solution into a loop reactor system. The loop reactor system included heat exchangers integral to the reactor to remove heat of reaction so that the reactor could be operated isothermally. Hydrogen was also added to the feed solution in sufficient quantity to control polymer molecular weight. The resulting polymer was produced in a molten state, followed by removal of the solvent and unreacted monomers, then pelletization of the final product. The separation and pelletization stages were performed using conventional equipment. The polymerization reaction utilized a Ziegler-Nana catalyst capable of polymerizing ethylene and a range of co-monomers, such as, but not limited to, 1-octene.

Comparative Examples 1 and 2 were made using a single loop reactor, with the final product produced as described above.

Inventive Example 1 was made using two loop reactors operated in series, wherein the entire contents of the first reactor flowed into the second reactor where additional polymerization occurred at prescribed operating conditions. Additional feed of monomers and solvent was supplied to the second reactor.

The temperature of each reactor, the relative amounts of polymer made in each reactor, the polymer molecular weight, and polymer co-monomer incorporation for each of Inventive Example 1, Comparative Example 1 and Comparative Example 2 are shown in Tables 1-3, respectively. All Inventive and Comparative Examples used 1-octene as the co-monomer, and the listed feed concentrations are expressed as a percentage of the combined ethylene/co-monomer stream entering the reactor. The hydrogen feed is a negligible fraction of the total mass flow into the reactors and thus not listed in Tables 1-3.

TABLE 1

| Condition or Property | Reactor 1 | Reactor 2 | Overall/Final Product |
|---|---|---|---|
| Reaction Temperature (° C.) | 155 | 195 | — |
| Solvent Feed Conc (wt %) | 82.4 | 87.7 | — |
| Ethylene Feed Conc (wt %) | 10.7 | 8.0 | — |
| Co-Monomer Feed Conc (wt %) | 6.9 | 4.3 | — |
| Ethylene Conversion (wt %) | 88.9 | 90.2 | — |
| Polymer Production (% of Total) | 50 | 50 | — |
| Polymer Co-Monomer Incorporation (wt %) | — | — | 9.74 |
| Density (g/cc) | 0.917 | 0.923 | 0.920 |
| Melt Index ($I_2$ @ 190° C.) | 0.085 | 9.15 | 0.52 |
| $I_{10}/I_2$ | — | — | 11.1 |

TABLE 2

| Condition or Property | Reactor 1 |
|---|---|
| Reaction Temperature (° C.) | 193 |
| Solvent Feed Conc (wt %) | 68.1 |
| Ethylene Feed Conc (wt %) | 21.2 |
| Co-Monomer Feed Conc (wt %) | 10.7 |
| Ethylene Conversion (wt %) | 93.2 |
| Polymer Production (% of Total) | 100 |
| Polymer Co-Monomer Incorporation (wt %) | 9.59 |
| Density (g/cc) | 0.920 |
| Melt Index ($I_2$ @ 190° C.) | 1.06 |
| $I_{10}/I_2$ | 8.0 |

TABLE 3

| Condition or Property | Reactor 1 |
|---|---|
| Reaction Temperature (° C.) | 182 |
| Solvent Feed Conc (wt %) | 71.7 |
| Ethylene Feed Conc (wt %) | 19.0 |
| Co-Monomer Feed Conc (wt %) | 9.3 |
| Ethylene Conversion (wt %) | 93.3 |
| Polymer Production (% of Total) | 100 |
| Polymer Co-Monomer Incorporation (wt %) | 9.05 |
| Density (g/cc) | 0.920 |
| Melt Index ($I_2$ @ 190° C.) | 0.49 |
| $I_{10}/I_2$ | 8.3 |

Table 4 provides the conventional molecular weight obtained by TDGPC and rheological properties for each of the Inventive and Comparative Examples.

TABLE 4

|  | Inventive Example 1 | Comparative Example 1 | Comparative Example 2 |
|---|---|---|---|
| $M_n$ (conv.), g/mol | 22,060 | 29,790 | 35,840 |
| $M_w$, (conv.) g/mol | 137,900 | 115,800 | 144,900 |
| $M_w/M_n$ | 6.3 | 3.9 | 4.0 |
| Viscosity @ 0.1 s$^{-1}$ (V0.1), Pa · s | 17,630 | 8,105 | 16,096 |
| Viscosity @ 100 s$^{-1}$ (V100), Pa · s | 1,638 | 1,610 | 2,194 |
| V0.1/V100 | 10.8 | 5.0 | 7.3 |
| Melt strength, cN | 6.2 | 3.2 | 6.1 |

Inventive example 1 has broader MWD than the two Comparative Examples. Inventive Example 1 has a melt index, $I_2$, of 0.52 dg/min but also exhibits a high-shear-rate viscosity (100 rad/s) similar to that exhibited by Comparative Example 1 which has an $I_2$ of 1.06 dg/min. Although the $I_2$ of inventive Example 1 and Comparative Example 2 are both less than 1.0 dg/min, Comparative Example 2 has a significantly higher high-shear-rate viscosity than Inventive Example 1. Thus, the resin of Inventive Example 1 is as easy to extrude as a higher, non-fractional, $I_2$ single reactor resin, Comparative Example 1. Inventive Example 1 has a melt strength close to a fractional, less than 1.0 dg/min, single reactor resin, meaning that the resin of Inventive Example 1 also has better bubble stability than a non-fractional melt $I_2$), single reactor resin. Thus, the resin of Inventive Example I would have a higher output rate than non-fractional $I_2$ single reactor resins.

Table 5 shows the blown film line processing parameters for each of the Inventive and Comparative Examples at controlled and maximum output rates. As shown in Table 5, at a standard output rate, the screen pressure, motor load and melt temperature of Inventive Example 1 are similar to those of Comparative Example 1 but are significantly lower than those measured using Comparative Example 2.

Running at maximum output rates, the screen pressure, motor load and melt temperature of Inventive Example 1 are slightly higher than those of Comparative Example 1. Nevertheless, the screen pressure, motor load and melt temperature of Inventive Example 1 remain substantially lower than those measured using Comparative Example 2. Moreover, the maximum output rate of Inventive Example 1 is significantly higher than that of Comparative Example 1 and only slightly lower than that of Comparative Example 2.

TABLE 5

|  | Units | Inventive Example 1 | Comparative Example 1 | Comparative Example 2 |
|---|---|---|---|---|
| Processing parameters at controlled output rate | | | | |
| Screw Speed | rpm | 249 | 250 | 251 |
| Screen Pressure | psi | 3,760 | 3,640 | 5,270 |
| Motor Load | hp | 5 | 5 | 7 |
| Melt Temperature | ° F. | 456 | 449 | 467 |
| Output Rate | lbs/hr/in | 10 | 10 | 10 |
| Processing parameters at maximum output rate | | | | |
| Screw Speed | rpm | 373 | 335 | 397 |
| Screen Pressure | psi | 4,430 | 4,050 | 5,450 |
| Motor Load | hp | 9 | 8 | 13 |
| Melt Temperature | ° F. | 473 | 461 | 522 |
| Output Rate | lbs/hr/in | 15 | 13 | 16 |

Table 6 shows that the film properties of the film produced using Inventive Example 1 exhibits equivalent dart, puncture, secant modulus and tear strength properties as those of films produced using Comparative Examples 1 and 2.

TABLE 6

|  | Units | Inventive Example 1 | Comparative Example 1 | Comparative Example 2 |
|---|---|---|---|---|
| Dart - Method A | g | 322 | 310 | 502 |
| Puncture | ft * lbf/in$^3$ | 267 | 285 | 320 |
| Secant Modulus - CD (1%) | psi | 47,384 | 43,413 | 44,954 |
| Secant Modulus - CD (2%) | psi | 39,149 | 35,699 | 37,549 |
| Secant Modulus - MD (1%) | psi | 38,999 | 37,749 | 38,584 |
| Secant Modulus - MD (2%) | psi | 33,423 | 31,945 | 32,573 |
| Elmendorf Tear - CD |  | 1,291 | 1,058 | 1,201 |
| Elmendorf Tear - MD |  | 582 | 778 | 791 |
| Tensile - CD | Psi | 1,913 | 1,908 | 1,914 |
| Tensile - MD | Psi | 1,719 | 1,775 | 1,819 |

Test Methods

Test methods include the following:

Density

Samples for density measurements were prepared according to ASTM D 4703. Density measurements were made within one hour of sample pressing using ASTM D792-08, Method B.

Melt Index

Melt index, $I_2$, was measured in accordance with ASTM D 1238, Condition 190° C./2.16 kg, and is reported in grams eluted per 10 minutes (g/10 min). The $I_{10}$ was measured in accordance with ASTM D 1238, Condition 190° C./10 kg, and is reported in g/10 min.

Triple Detector Gel Permeation Chromatography (TDGPC)—Conventional GPC

For the GPC techniques used herein (Conventional GPC, Light Scattering GPC), a Triple Detector Gel Permeation Chromatography (3D-GPC or TDGPC) system was used. This system consists of a Waters (Milford, Mass.) model 150 C High Temperature Chromatograph (other suitable high temperatures GPC instruments include Polymer Laboratories (Shropshire, UK; Model 210 and Model 220), equipped with a Precision Detectors (Amherst, Mass.) 2-angle laser light scattering (LS) detector Model 2040, an IR4 infra-red detector from Polymer ChAR (Valencia, Spain), and a Viscotek (Houston, Tex.) 150R 4-capillary solution viscometer (DP).

A GPC with these latter two independent detectors and at least one of the former detectors is sometimes referred to as "3D-GPC" or "TDGPC," while the term "GPC" alone generally refers to conventional GPC. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

The eluent from the GPC column set flows through each detector arranged in series, in the following order: LS detector, IR4 detector, then DP detector. The systematic approach for the determination of multi-detector offsets is performed in a manner consistent with that published by Balke, Mourey, et at. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard.

Suitable high temperature GPC columns can be used, such as four 30 cm long Shodex HT803 13 micron columns, or four 30 cm Polymer Labs columns of 20-micron mixed-pore-size packing (MixA LS, Polymer Labs). Here, the MixA LS columns were used. The sample carousel compartment is operated at 140° C., and the column compartment is operated at 150° C. The samples are prepared at a concentration of "0.1 grams of polymer in 50 milliliters of solvent." The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are gently stirred at 160° C. for four hours. The injection volume is 200 microliters. The flow rate through the GPC is set at 1 ml/minute, Conventional GPC For Conventional GPC, the IR4 detector is used, and the GPC column set is calibrated by running 21 narrow molecular weight distribution polystyrene standards. The molecular weight (MW) of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to or greater than 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym, Letters, 6, 621 (1968)):

$$M_{polyethylene} = A \times (M_{polystyrene})^B \quad (Eq. 1),$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left(\frac{C_i}{\sum_i C_i}\right) M_i = \sum_i w_i M_{cc,i} \quad (Eq. 2)$$

$$M_{n,cc} = \sum w_i / \sum (w_i / M_{cc,i}) \quad (Eq. 3)$$

$$M_{z,cc} = \sum (w_i M_{cc,i}^2) / \sum (w_i M_{cc,i}) \quad (Eq. 4)$$

Melt Strength

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips located 100 mm below the die, with an acceleration of 2.4 mm/s². The tensile force was recorded as a function of the take-up speed of the nip rolls, Melt strength was reported as the plateau force (cN) before the strand broke. The following conditions were used in the melt strength measurements: plunger speed=0.265 mm/second; wheel acceleration=2.4 mat/s²; capillary diameter=2.0 mm; capillary length=30 mm; and barrel diameter=12 mm.

Dynamic Mechanical Spectroscopy (DMS)

Resins were compression-molded into "3 mm thick×1 inch" circular plaques at 350° F. (177° C.) for five minutes, under 1500 psi pressure in air. The sample was then taken out of the press, and placed on the counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate is removed), and then the test was started. The method had an additional five minute delay built in, to allow for temperature equilibrium. The experiments were performed at 190° C. over a frequency range of 0.1 to 100 rad/s. The strain amplitude was constant at 10%. The stress response was analyzed in terms of amplitude and phase, from which the storage modulus (G'), loss modulus (G"), complex modulus (G*), complex viscosity η*, tan (δ) or tan delta, viscosity at 0.1 rad/s (V0.1), the viscosity at 100 rad/s (V100), and the viscosity ratio (V0.1/V100) were calculated.

Determination of Maximum Output Rate of Blown Film

Film samples were collected at a controlled rate and at a maximum rate. The controlled rate was 250 Lb/Hr which equals an output rate of 10 Lb/Hr/Inch of die circumference. Note the die diameter used for the maximum output trials is an 8" die so that for the controlled rate, as an example, the conversion between Lb/Hr and Lb/Hhr/Inch of die circumference is shown in Equation 5. Similarly, such an equation can be used for other rates, such as the maximum rate, by substituting the maximum rate in Equation below to determine the lb/hr/inch of die circumference.

$$\text{Lb/Hr/Inch of Die Circumference} = (250\ \text{Lb/Hr}) / (8*\pi) = 10\ \text{Lb/Hr/Inch} \quad (Eqn. 5)$$

The maximum rate for a given sample was determined by increasing the output rate to the point where bubble stability is the limiting factor. The extruder profile was maintained for both samples (standard rate and maximum rate), however the melt temperature was higher for the maximum rate samples due to the increased shear rate. The maximum rate was determined by maximizing both the internal bubble cooling and the external cooling via the air ring. The maximum bubble stability was determined by taking the bubble to the point where any one of the following things was observed (a) the bubble would not stay seated in the air ring (b) the bubble started to lose its shape (c) the bubble started to breathe in and out or (d) the frost line height would become unstable. At that point the rate was reduced to where the bubble was reseated in the air ring while maintaining the shape of the bubble and a steady frost line height and then a sample was collected. The cooling on the bubble was adjusted by adjusting the air ring and maintaining the bubble. This was taken as the maximum output rate while maintaining bubble stability.

Monolayer films were produced. The die diameter was 8 inches, the die gap is 70 mils, the blow up ratio is 2.5, and internal bubble cooling was used.

Film Properties

Machine direction (MD) and cross direction (CD) Elmendorf Tear Strength was tested in accordance with ASTM D-1922.

Dart Impact Strength was tested in accordance with ASTM D-1709.

Puncture was measured on an histron Model 4201 with Sintech. Testworks Software Version 3.10. The specimen size was 6"×6" and 4 measurements were made to determine an average puncture value. The film was conditioned for 40 hours after film production and at least 24 hours in an ASTM controlled laboratory. A 100 lb load cell was used with a round specimen holder. The specimen was a 4 inch circular specimen. The puncture probe is a ½ inch diameter polished stainless steel ball (on a 0.25 inch rod) with a 7.5 inch maximum travel length. There was no gauge length; the probe is as close as possible to, but not touching, the specimen. The crosshead speed used was 10 inches/minute. The thickness was measured in the middle of the specimen. The thickness of the film, the distance the crosshead traveled, and the peak load were used to determine the puncture by the software. The puncture probe was cleaned using a "Kim-wipe" after each specimen.

MD and CD Tensile Strength was measured in accordance with ASTM D-882.

Secant Modulus, Md. (machine direction) and CD (cross direction) were measured in accordance with ASTM D-882.

We claim:

1. A reactor blend polyethylene composition comprising:
   from 35 to 70 percent by weight of a first polyethylene component; and
   a second polyethylene component;
   wherein the polyethylene composition has a melt index $I_2$ of less than 1 dg/min and greater than or equal to 0.25 dg/min and exhibits a V0.1/V100 of greater than or equal to 9; and
   wherein the first and second polyethylene components are produced in continuous dual solution polymerization reactors, wherein the second polyethylene component is produced in the presence of the first polyethylene component and wherein a Ziegler-Natta catalyst is present in each of the first and second polymerization reactors.

2. The polyethylene composition according to claim 1, wherein the polyethylene composition has a density from 0.90 to 0.94 g/cc.

3. The polyethylene composition according to claim 1, wherein the polyethylene composition has a density from 0.915 to 0.930 g/cc.

4. The polyethylene composition according claim 1, wherein the polyethylene composition has a melt strength of at least 4.5 cN.

5. The polyethylene composition according to claim 1, wherein the polyethylene composition has a melt strength of at least 6.0 cN.

6. The polyethylene composition according to claim 1, wherein the polyethylene composition has a Mw/Mn of equal to or greater than 5.

7. The polyethylene composition according to claim 1, wherein the Ziegler-Natta catalyst in the first polymerization reactor is the same or different as the Ziegler-Natta catalyst in the second polymerization reactor.

8. The polyethylene composition according claim 1, wherein the polyethylene composition has a melt index ($I_2$) from 0.3 to 0.75 dg/min.

9. The polyethylene composition according to claim 1, wherein the polyethylene composition has a melt index ($I_2$) from 0.4 to 0.6 dg/min.

10. The polyethylene composition according to claim 1, wherein the polyethylene composition may be used in a blown film process at motor load, screen pressures and melt temperatures within 10% of those of a polyethylene resin having a melt index ($I_2$) of equal to or greater than 1 and achieving at least a 10% increase in output rate in comparison to the polyethylene resin having a melt index ($I_2$) of equal to or greater than 1.

11. A process for producing a reactor blend polyethylene composition comprising:
    polymerizing from 35 to 70 percent by weight of a first polyethylene component in the presence of a first Ziegler-Natta catalyst in a first polymerization reactor to make a first reactor product having a melt index ($I_2$) of less than 0.1;
    continuously passing the first reactor product to a second polymerization reactor, wherein the second polymerization reactor contains a second Ziegler-Natta catalyst to make the reactor blend polyethylene composition;
    wherein the polyethylene composition has a melt index ($I_2$) less than 1 dg/min and greater than or equal to 0.25 dg/min.

12. A film comprising the polyethylene composition of claim 1.

13. The film according to claim 12, wherein the film has a dart value within 10% of that of a polyethylene composition having a melt index ($I_2$) of equal to or greater than 1.

14. The film according to claim 13, wherein the film has a tensile strength within 10% of that of a polyethylene composition having a melt index ($I_2$) of equal to or greater than 1.

15. The film according to claim 14, wherein the film has a puncture resistance within 10% of that of a polyethylene composition having a melt index ($I_2$) of equal to or greater than 1.

* * * * *